(12) United States Patent
Jacobs et al.

(10) Patent No.: US 8,885,558 B2
(45) Date of Patent: Nov. 11, 2014

(54) SYSTEM AND METHOD FOR MULTIPLE ACCESS SENSOR NETWORKS

(75) Inventors: Scott William Jacobs, Peoria, IL (US); Karl William Kleimenhagen, Peoria, IL (US); Roger Dwight Watkins, Dunlap, IL (US); Dexter Grant Travis, Kyle, TX (US)

(73) Assignee: Robert Bosch GmbH, Stuttgart (DE)

( * ) Notice: Subject to any disclaimer, the term of this patent is extended or adjusted under 35 U.S.C. 154(b) by 266 days.

(21) Appl. No.: 13/247,807

(22) Filed: Sep. 28, 2011
(Under 37 CFR 1.47)

(65) Prior Publication Data

US 2013/0077565 A1    Mar. 28, 2013

(51) Int. Cl.
*H04W 4/00* (2009.01)
*H04W 74/08* (2009.01)
*H04W 88/08* (2009.01)

(52) U.S. Cl.
CPC .......... *H04W 74/0825* (2013.01); *H04W 88/08* (2013.01)
USPC ........................... 370/328; 370/448; 370/453

(58) Field of Classification Search
None
See application file for complete search history.

(56) References Cited

U.S. PATENT DOCUMENTS

| | | | |
|---|---|---|---|
| 3,882,383 A | 5/1975 | Matlin | |
| 4,396,149 A | 8/1983 | Hirsch | |
| 4,931,775 A | 6/1990 | Sheriff | |
| 5,291,475 A | 3/1994 | Bruckert | |
| 5,606,322 A * | 2/1997 | Allen et al. | 341/173 |
| 5,621,669 A | 4/1997 | Bjornsson | |
| 5,737,358 A | 4/1998 | Ritz et al. | |
| 5,813,606 A | 9/1998 | Ziff | |
| 5,845,204 A | 12/1998 | Chapman et al. | |
| 5,896,375 A | 4/1999 | Dent et al. | |
| 5,969,620 A | 10/1999 | Okulov | |
| 5,982,742 A | 11/1999 | Leung et al. | |
| 6,019,290 A | 2/2000 | Grott | |
| 6,198,398 B1 | 3/2001 | Velasquez | |
| 6,234,403 B1 | 5/2001 | Grott | |

(Continued)

FOREIGN PATENT DOCUMENTS

| | | |
|---|---|---|
| EP | 0617875 A1 | 10/1994 |
| EP | 1424814 A1 | 6/2004 |

(Continued)

OTHER PUBLICATIONS

International Search Report and Written Opinion in corresponding PCT application (i.e., PCT/US2012/057771), mailed Jan. 21, 2013 (10 pages).

(Continued)

*Primary Examiner* — Jeffrey M Rutkowski
*Assistant Examiner* — Hardikkumar Patel
(74) *Attorney, Agent, or Firm* — Maginot Moore & Beck LLP

(57) ABSTRACT

A method enables a radio receiver to distinguish sensor probes supplying data to the receiver over a long period of time. The method includes each probe generating a random number sent to the receiver to identify the probe. Each probe and the receiver also uses a pseudo-random process to identify a time of transmission for each probe. The pseudo-random process helps keep the transmission times for the probes separate in the presence of oscillator drift. If a transmission collision occurs, the receiver ignores all probes in the collision and waits until the pseudo-random process separates the probe transmissions.

8 Claims, 7 Drawing Sheets

(56) References Cited

U.S. PATENT DOCUMENTS

| | | |
|---|---|---|
| 6,589,170 B1 | 7/2003 | Flach et al. |
| 6,629,776 B2 | 10/2003 | Bell et al. |
| 6,717,992 B2 | 4/2004 | Cowie et al. |
| 6,813,260 B1 | 11/2004 | Fogle |
| 6,904,789 B2 | 6/2005 | Campbell et al. |
| 6,975,236 B2 | 12/2005 | Staples |
| 6,980,823 B2 | 12/2005 | Challa et al. |
| 7,142,896 B2 | 11/2006 | Lee |
| 7,174,130 B2 | 2/2007 | Kurisko et al. |
| 7,183,896 B2 | 2/2007 | Qualich et al. |
| 7,216,659 B2 | 5/2007 | Caamano et al. |
| 7,231,298 B2 | 6/2007 | Hnilica-Maxwell |
| 7,236,544 B2 | 6/2007 | Williams et al. |
| 7,245,725 B1 * | 7/2007 | Beard ............... 380/270 |
| 7,245,936 B2 | 7/2007 | Bahl et al. |
| 7,400,975 B2 | 7/2008 | Glenn et al. |
| 7,408,914 B2 | 8/2008 | Krishnan et al. |
| 7,411,998 B1 | 8/2008 | Cole |
| 7,474,105 B2 | 1/2009 | McDermid |
| 7,571,075 B2 | 8/2009 | Glenn et al. |
| 7,587,297 B2 | 9/2009 | Glenn et al. |
| 7,782,193 B2 | 8/2010 | Goh et al. |
| 7,810,515 B2 | 10/2010 | Nies et al. |
| 7,848,272 B2 | 12/2010 | Myers et al. |
| 2001/0050580 A1 * | 12/2001 | O'Toole et al. ............... 327/158 |
| 2003/0043934 A1 | 3/2003 | Roberts |
| 2003/0148800 A1 | 8/2003 | Lee |
| 2003/0181161 A1 * | 9/2003 | Harles et al. ............... 455/12.1 |
| 2004/0190597 A1 | 9/2004 | Cowie et al. |
| 2005/0041692 A1 * | 2/2005 | Kallstenius ............... 370/503 |
| 2005/0269418 A1 * | 12/2005 | Fuller ............... 236/44 A |
| 2006/0121899 A1 * | 6/2006 | Willey et al. ............... 455/435.1 |
| 2006/0153052 A1 * | 7/2006 | Meerwald et al. ......... 369/275.1 |
| 2006/0251107 A1 | 11/2006 | Geren et al. |
| 2006/0271969 A1 | 11/2006 | Takizawa et al. |
| 2006/0290360 A1 | 12/2006 | Lee |
| 2007/0041398 A1 * | 2/2007 | Benveniste ............... 370/448 |
| 2007/0282492 A1 | 12/2007 | Valovage et al. |
| 2008/0031152 A1 | 2/2008 | Tseng |
| 2008/0104399 A1 * | 5/2008 | Fascenda ............... 713/168 |
| 2008/0304410 A1 | 12/2008 | Park et al. |
| 2009/0140865 A1 | 6/2009 | Gunsay |
| 2009/0219037 A1 | 9/2009 | Campbell |
| 2009/0238210 A1 | 9/2009 | Myers et al. |
| 2009/0276102 A1 | 11/2009 | Smith et al. |
| 2009/0289776 A1 * | 11/2009 | Moore et al. ............... 340/10.41 |
| 2009/0302870 A1 | 12/2009 | Paterson et al. |
| 2010/0066506 A1 | 3/2010 | Schaefer et al. |
| 2010/0090713 A1 | 4/2010 | Geisel |
| 2010/0109685 A1 | 5/2010 | Morton |
| 2010/0110929 A1 | 5/2010 | Li et al. |
| 2010/0277185 A1 * | 11/2010 | Hughes ............... 324/664 |
| 2010/0277342 A1 | 11/2010 | Sicurello et al. |
| 2010/0303185 A1 | 12/2010 | Haartsen |

FOREIGN PATENT DOCUMENTS

| | | | |
|---|---|---|---|
| EP | 1802041 A1 | 6/2007 | |
| EP | 1969922 A1 * | 9/2008 | ............. A01G 25/16 |
| KR | 10-0941087 | 2/2010 | |

OTHER PUBLICATIONS

Molisch, A et al.; "Time hopping and frequency hopping in ultrawideband systems"; Mitsubishi Technical Report TR2003-92; Jul. 2003 (7 pages).

Miller, David A. et al.; "FlexTDMA for Delay-Stable Communications in Asynchronous Industrial Control Networks"; LCN '10 Proceedings of the 2010 IEEE 35th Conference on Local Computer Networks; 2010 (4 pages).

Westlund, Lane; "Random Number Generation Using the MSP430"; Texas Instruments Application Report SLAA338; Oct. 2006 (4 pages).

Rouse, Margaret; "What is CSMA/CA", available at: http://searchnetworking.techtarget.com/definition/CSMA-CA, Oct. 2008.

* cited by examiner

SYSTEM AND METHOD FOR MULTIPLE ACCESS SENSOR NETWORKS

TECHNICAL FIELD

This patent relates generally to the fields of wireless data transmission, and, more specifically, to systems and methods for enabling a receiver to detect wireless transmissions that are generated by multiple transmitters.

BACKGROUND

Many industries employ remote sensing to provide information collected from multiple remote locations to a single display. One example of a remote sensing system is a moisture sensing system. The moisture sensing system includes a plurality of moisture sensors that are placed at different locations in a garden, field, or any location where moisture detection is desired. Each moisture sensor is configured to perform one or more moisture measurements including the moisture level of soil and humidity measurements. Each of the moisture sensors further includes a transmitting device, typically a radio transmitter, that transmits signals to a receiving station. The signals transmitted from each sensor include data that represent the moisture measurements from each of the corresponding sensors. The receiving station typically includes a display that can inform a user of the moisture levels detected by the remote moisture sensors. Some receiving station embodiments include visual or audible alarms that can inform an operator if detected moisture levels either exceed or fall below a desired range in the location of one or more sensors. Various receiving station embodiments additionally include electronic data collection devices to store a history of detected moisture levels generated by the moisture sensors over time.

Remote sensing networks, including moisture sensing networks, face challenges in operation. One such challenge is that remote sensor networks may be deployed in a dense configuration that can lead to false sensor signals. For example, if sensor network A is deployed in one field, while sensor network B is deployed in a second field that is across a road from the first field, then the transmitters coupled to the moisture sensors in network A may generate signals that are confused with the transmitters of network B, and vice-versa. The proximity of the sensor networks can lead to interference or false moisture readings at the corresponding receivers for each of the sensor networks. Even if only a single sensor network is deployed in one location, the transmitters from different sensors in the network may interfere with each other as well.

Prior art radio networks include techniques including carrier sensing multiple access (CSMA) with collision avoidance and collision detection techniques to mitigate the problems described above. Additionally, cellular data networks are known that use numerous modulation techniques to enable multiple cellular telephones to operate simultaneously. Many sensor networks, however, are not well suited to using these techniques. In a typical sensor network, the sensors and associated transmitters are designed to be low cost and to operate for long periods of time using a battery. Since the sensors are exposed to the environment, any electronics need to be rugged and capable of operating under a wide range of weather conditions for a prolonged time period. Consequently, the transmitters often include low cost electronics and one-way radio transmitters that are not capable of performing known multiple access techniques without requiring costly design changes or reductions in battery life and reliability. Therefore, techniques to improve the operation of sensor networks with multiple transmitters that transmit data to a single receiver would be beneficial.

SUMMARY

In one embodiment, a method for multiple access has been developed. The method includes generating a first random number in a first radio transmitter, transmitting the first random number from the first radio transmitter to a radio receiver, generating a second random number in a second radio transmitter, transmitting the second random number from the second radio transmitter to the radio receiver, identifying a first time for transmission of a first data message from the first radio transmitter with reference to a current time measurement identified by the first transmitter and a predetermined time period that is adjusted by a first time offset, the first time offset being identified with reference to the first random number and a predetermined pseudo-random process, transmitting the first data message from the first radio transmitter at the first identified time, identifying a first time for transmission of a first data message from the second radio transmitter with reference to a current time measurement identified by the second transmitter and the predetermined time period that is adjusted by a second time offset, the second time offset being identified with reference to the second random number and the predetermined pseudo-random process, and transmitting the second data message from the second radio transmitter at the second identified time.

In another embodiment, a sensor probe for use in a remote sensor system has been developed. The probe includes a sensor configured to generate sensor signals, a radio transmitter module, and a controller operatively connected to the sensor and the radio transmitter module. The controller is configured to generate a random number, operate the radio transmitter module to transmit the random number to a radio receiver, identify a first time period with reference to a predetermined time period that is adjusted by a first time offset, the first time offset being identified with reference to the random number and a predetermined pseudo-random process, wait for an expiration of the first time period, and transmit a data message from the first radio transmitter at the expiration of the first time period.

In another embodiment, a receiver for use in a sensor system has been developed. The receiver includes a radio receiver module, an output device, and a controller operatively connected to the radio receiver module and the output device. The controller is configured to receive data corresponding to a random number from a signal transmitted by a first transmitter and received by the radio receiver module, identify a first time period with reference to a predetermined time period that is adjusted by a first time offset, the first time offset being identified with reference to the random number and a predetermined pseudo-random process, operate the radio receiver module at a first electrical power level for the first time period, and operate the radio receiver module at a second electrical power level for a second time period after the first time period to enable the receiver to receive a first data message transmitted by the first transmitter, the second electrical power level being greater than the first electrical power level.

DETAILED DESCRIPTION

Figure 1:
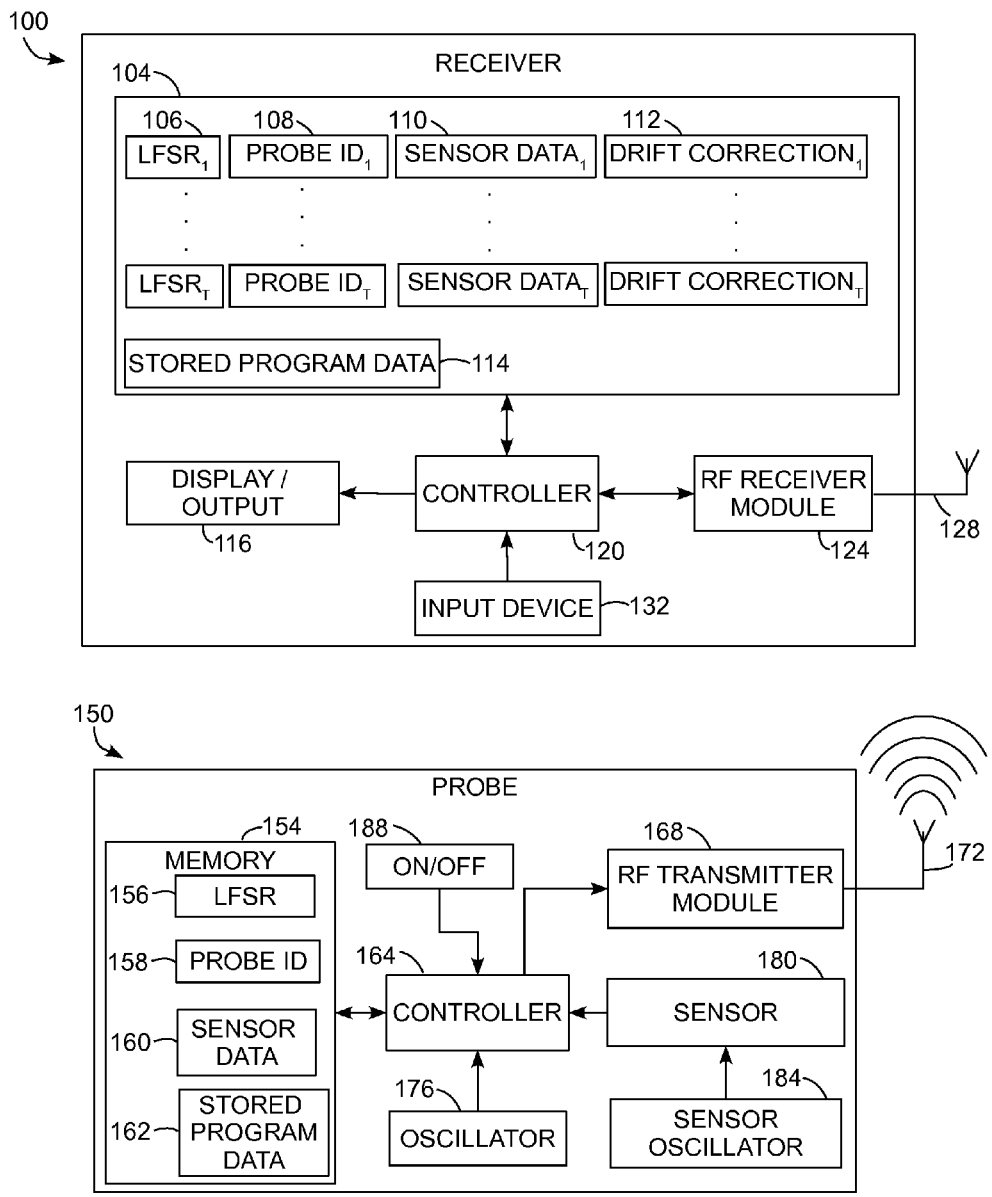
FIG. 1 is a schematic view of a receiver and sensor probe.

For the purposes of promoting an understanding of the principles of the embodiments disclosed herein, reference is now be made to the drawings and descriptions in the following written specification. No limitation to the scope of the subject matter is intended by the references. The present patent also includes any alterations and modifications to the illustrated embodiments and includes further applications of the principles of the disclosed embodiments as would normally occur to one skilled in the art to which this patent pertains.

As used herein, the terms "multiple access" and "multiple access systems" refers to methods and systems including a plurality of transmitters that broadcast to one or more receivers via a shared communication medium. A common example of a multiple access system includes two or more radio transmitters that each broadcast signals using a common frequency band, or shared communication medium, and that are both positioned within range of a common receiver. In time division multiple access (TDMA) systems, the transmitters can transmit signals over the shared communication medium at different times. As used herein, the term "collision" refers to any event that occurs in a multiple access system where a receiver is unable to receive a message from a transmitter because two or more transmission signals conflict with the shared communication medium. For example, in a TDMA system, if two or more signals transmitted from different transmitters arrive at a receiver simultaneously, then the receiver is unable to distinguish between the signals and cannot effectively receive data encoded in the signals.

As used herein the terms "pseudo-random process" refers to various systems and methods that generate numbers in a seemingly random but deterministic manner. For example, various configurations of linear feedback shift registers (LFSRs) generate numbers in a pseudo-random manner. The LFSR includes a register, i.e. memory, that holds a first number represented as a predetermined number of binary bits. The LFSR follows a predetermined series of operations to manipulate the bits in the memory to generate a new number, referred to as a "pseudo-random number" that replaces the first number in the register. The value of the next pseudo-random number generated by the LFSR depends on the present number stored in the LFSR and the predetermined operations that the LFSR performs on the present number to generate the next number. The term "seed" refers to an operation that initializes an LFSR by loading a seed number into the register. Given the repeatable nature of the pseudo-random process, two different devices can generate identical sequences of pseudo-random numbers if both devices implement the same pseudo-random process and if both processes are initialized with a common seed number.

As used herein, the term "random number" refers to a number that is generated by a device in a non-deterministic manner. The related term "random number generator" refers to a device or process that generates numbers in the non-deterministic manner. Various components in the radio transmitters described below have non-deterministic operating characteristics that can be measured to generate random numbers. Unlike the pseudo random process, the random generator does not generate numbers in a deterministic manner. Numbers generated via a random number generator can be used to seed a pseudo-random number generator. While the generation of unbiased random numbers is a topic of intense study in various fields such as cryptography, suitable random number generators for this document include any number generator that generates numbers with sufficient randomness, or entropy, to enable operation of the multiple access systems described below.

As used herein, the term "frequency drift" refers to variations in the frequency of a periodic signal source such as an oscillator. For example, an oscillator with a frequency of 1,000 Hz and zero frequency drift completes 1,000 cycles in one second. Typical oscillators used in electronic devices, however, have non-zero frequency drifts. One such oscillator with a frequency drift of +10 cycles will instead oscillate with a frequency of 1,010 cycles in one second. The frequency of an oscillator can be used as a basis for measuring time, so a frequency drift in an oscillator can generate a corresponding time drift when measuring time. As used herein, the term "time drift" refers to variations between an expected time period and an actual time period due to errors in measuring time, often due to frequency drift of an oscillator. For example, using the aforementioned nominal 1,000 Hz oscillator with the positive frequency drift of +10 cycles leads to a 100 second nominal time period actually being measured in 99 seconds with a one second time drift error. The frequency drift of an oscillator and corresponding time drift typically change over time as the temperature, drive voltage, and other parameters of the oscillator vary during operation.

FIG. 1 depicts functional blocks of a receiver 100, and a probe 150 that is configured to transmit sensor data to the receiver 100. The receiver 100 includes a memory 104, display or output 116, controller 120, radio frequency (RF) receiver module 124, antenna 128, and input device 132. The memory 104 is configured to store data corresponding to the contents of one or more linear feedback shift registers (LFSRs) 106, probe identifiers 108, sensor data entries 110, and drift correction values 112. Each of the memory entries 106-112 corresponds to a single probe such as probe 150 that transmits data to the receiver 100. Various embodiments of the memory 104 include static and dynamic random access memory (RAM), non-volatile memory including NAND and NOR flash, magnetic data storage devices, and any data storage device that can store and retrieve digital data.

The RF receiver module 124 is configured to receive radio signals that are generated by one or more of the probes 150. The RF module is connected to an antenna 128 that is configured to receive radio signals generated by the probes 150. The radio signals include encoded data that the RF receiver module 124 can decode into a form that is suitable for use with the controller 120, and the RF module 124 is communicatively coupled to the controller 120. In one exemplary embodiment, the RF receiver module 124 is a Texas Instruments® CC1101 receiver. Some or all of the operations of the RF receiver module 124 can be implemented in software in the controller 120.

The display or output device 116 is operatively connected to the controller 120. The display device 116 is configured to display alerts and information about the sensor data that the receiver 100 receives from one or more of the probes 150. One configuration the display 116 is a series of lights where each light corresponds to a probe. The controller 120 activates and deactivates the lights to alert a user to the status of a probe. For example, in embodiments where the probe 150 includes a soil moisture sensor, the controller 120 can activate a light when the receiver 100 receives data from the probe 150 indicating that the soil should be watered. In another embodiment, the display 116 is a visual display panel such as a liquid crystal display (LCD) that displays information corresponding to the data received from the probes 150. In still other embodiments, the output 116 generates non-visual alerts such as audible alerts or synthesized speech that inform a user of the status of one or more of the probes 150.

The controller 120 is an electronic processing device such as a microcontroller, application specific integrated circuit (ASIC), field programmable gate array (FPGA), microprocessor including microprocessors from the x86 and ARM families, or any electronic device that is configured with programmed instructions and electronic components to perform the functions of the receiver 100 disclosed herein. In some embodiments, the controller 120 is implemented in a system on a chip (SoC) configuration where the controller 120 and one or more of the memory 104, RF Receiver module 124, and controls for the display device 116 are integrated into a single device. In one exemplary embodiment, the controller 120 is a Texas Instruments® MSP430F4132 microcontroller. The controller 120 is operationally connected to the memory to enable the controller 120 to store data into the memory 104 and load data from the memory 104 for processing. During operation, the controller 120 loads program data from stored program data 114. The stored program data 114 include instructions that the controller 120 executes during operation of the receiver 100. An input device 132 is operatively connected to the controller 120 to enable the controller 120 to switch between two or more operating modes or to adjust the operation of the receiver 100. Various input device embodiments include one or more switches or buttons, alphanumeric key inputs, and a touchscreen input that can be integrated with the display 116.

The controller 120 is operatively connected to the RF receiver module 124. In addition to receiving data corresponding to the signals that the RF receiver 124 receives, the controller 120 is configured to control the operating parameters of the RF receiver 124. Various operating parameters of the RF receiver 124 include operating frequency, bit rate, and encoding settings for the RF receiver 124. The controller 120 is also configured to switch the RF receiver 124 between a high-power mode for receiving transmissions and a low-power or "standby" operating mode that consumes less electrical power. In the low-power mode, the RF receiver 124 is either deactivated and does not receive data transmissions, or receives data transmissions with a reduced sensitivity due to the deactivation of certain receiver components such as amplifiers. As described in more detail below, the controller 120 switches the RF receiver 124 between the low-power and high-power modes at selected times to receive transmissions from one or more of the probes 150.

The probe 150 is configured to transmit sensor data to the receiver 100. The probe 150 includes a memory 154, controller 164, RF transmitter module 168, controller oscillator 176, a sensor 180, and a sensor oscillator 184. The probe memory 154 stores data corresponding to the contents of a linear feedback shift registers (LFSR) 156, a sensor identification number 158, sensor data 160, and stored program data 162. Various embodiments of the memory 154 include static and dynamic random access memory (RAM), non-volatile memory including NAND and NOR flash, magnetic data storage devices, and any data storage device that can store and retrieve digital data. In the embodiment of FIG. 1, the memory 154 is integrated with the controller 164.

The RF transmitter module 168 is configured to transmit radio signals to a receiver such as receiver 100. The RF transmitter module 168 is connected to an antenna 172 that promotes transmission of the radio signals. The controller 164 provides data to the RF transmitter module 168 that the RF transmitter 168 encodes into the transmitted radio signals. The RF transmitter module is configured to operate using frequencies, modulation techniques and data encoding techniques that are compatible with the RF receiver module 124 in the receiver 100. In some embodiments, the RF transmitter module 168 and corresponding RF receiver module 124 is also configured to implement error detection and error correction codes to enable the receiver 100 to identify and potentially correct errors in the transmitted data. In one exemplary embodiment, the transmitter module is a Texas Instruments® CC1150RS transmitter that is compatible with the CC1101 receiver module in the receiver 100. Some or all of the operations of the RF transmitter module 168 can be implemented in software in the controller 164.

The controller 164 is an electronic processing device such as a microcontroller, application specific integrated circuit (ASIC), field programmable gate array (FPGA), microprocessor including microprocessors from the x86 and ARM families, or any electronic device that is configured with programmed instructions and electronic components to perform the functions of the probe 150 disclosed herein. In some embodiments, the controller 164 is implemented in a system on a chip (SoC) configuration where the controller 164 and one or more of the memory 154, RF transmitter module 168, and sensor 180 are integrated into a single device. In one exemplary embodiment, the controller 164 is a Texas Instruments® MSP430F2121IPW microcontroller. The controller 164 is operationally connected to the memory 154 to enable the controller 164 to store data into the memory 154 and load data from the memory 154 for processing. During operation, the controller 164 loads program data from stored program data 154. The stored program data 154 include instructions that the controller 164 executes during operation of the probe 150.

An oscillator 176 is operatively connected to the controller 164. The oscillator provides a periodic signal that regulates synchronized operations in the controller 164, and also serves as a time reference for the controller 164. The oscillator 176 experiences frequency drift during operation, and the drift in the frequency of the oscillator 176 introduces a time drift into time measurements performed by the controller 164. The controller 164 is configured to operate the RF transmitter module 168 to transmit signals at predetermined time intervals as described in more detail below. The time drift introduced by the oscillator 176 generates a variation between the expected time period and the actual time period between transmissions.

The sensor 180 is configured to sense one or more environmental conditions around the probe 150. In the example of FIG. 1, the sensor 180 is a soil moisture sensor that further includes a capacitive sensor element that is inserted into soil. A sensor oscillator 184 generates a frequency signal that passes through the capacitive sensor element. The dielectric permittivity and corresponding capacitance of the sensor element are affected by the moisture content of the soil. The operating frequency of the sensor oscillator 184 changes in response to changes in the capacitance of the sensor element, and sensor 180 is configured to generate data corresponding to the oscillator frequency to the controller 164. The controller 164 generates probe data corresponding to the data received from the sensor 180. In some embodiments the controller 164 provides the data from the sensor 180 to the RF transmitter 168 directly, while in other embodiments the controller 164 performs further processing to identify a soil moisture measurement from the sensor data. The controller 164 stores data from the sensor 180 as sensor data 160 in the memory 154. The sensor data 160 may contain one or more readings from the sensor 180.

While the probe 150 is described with reference to a soil moisture sensor, a wide range of alternative probe embodiments include one or more sensors. Examples of environmental sensors include, but are not limited to, temperature, air humidity, wind, sunlight, radiation, seismic, and air quality sensors. Different probe embodiments include two or more sensors in a single probe that provide data for transmission to a receiver.

Figure 2:
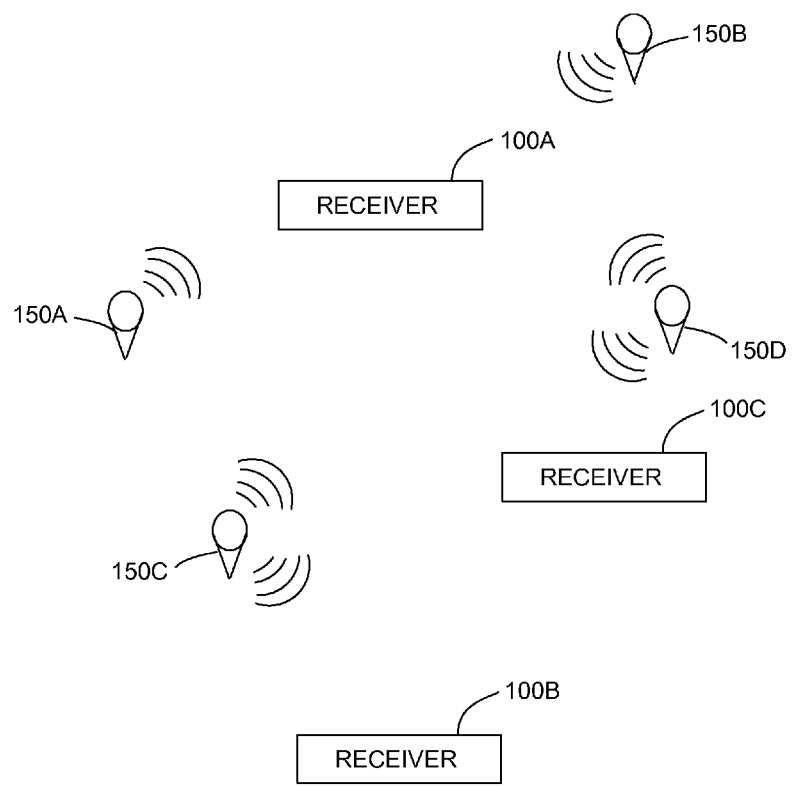
FIG. 2 is a view of a plurality of receivers and sensor probes deployed in proximity to one another.

FIG. 2 depicts an exemplary configuration of a plurality of receivers 100A-100C and probes 150A-150D that are deployed in separate sensor networks within transmission range of each other. In one sensor network, receiver 100A is configured to receive data from probes 150A and 150B, but not from probes 150C and 150D. The receiver 100A is also within range of signals that are generated by the probes 150C and 150D. In another sensor network, the receiver 100B is configured to receive signals only from probe 150C, and in still another sensor network the receiver 100C is configured to receive signals only from probe 150D. The receivers 100A-100C could correspond to different neighboring land owners who each have probes at one or more locations in each parcel of land, and who want to ignore data sent from probes in neighboring property.

In the configuration of FIG. 2, the receiver 100A can detect signals from each of the probes 150A-150D. One event that can occur happens when one of probes 150C and 150D transmits a signal. The receiver 100A should ignore the data transmissions from the probes 150C and 150D. In another event, a collision occurs when signals transmitted from two or more probes arrive at the receiver 100A simultaneously. In one instance, a collision causes interference between the signals so that the receiver 100A cannot extract correct data from the signal. In another instance, a collision results in the receiver 100A receiving data from an incorrect probe while failing to receive data from the intended probe. The following processes enable a receiver and one or more probes to operate in noisy environments such as the environment depicted in FIG. 2.

Figure 3:
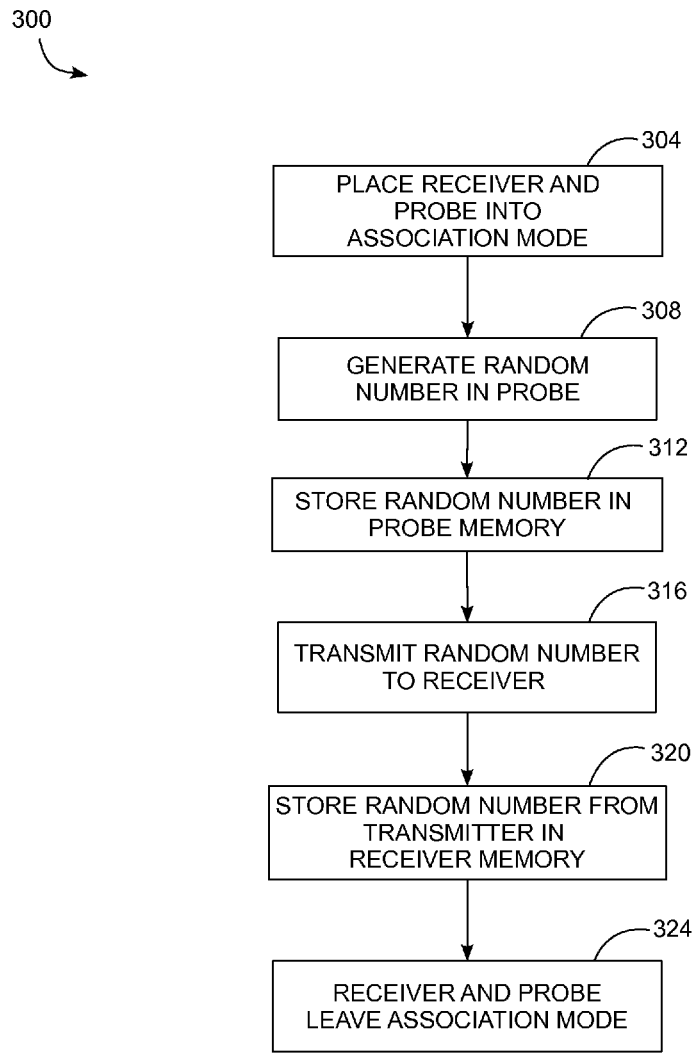
FIG. 3 is a block diagram of a method for associating probe with a receiver.

FIG. 3 depicts a process 300 for associating a selected probe with a receiver that enables the receiver to identify transmissions sent from the probe. The receiver 100 and probe 150 are used as examples to illustrate the process 300. Process 300 begins by placing the receiver 100 and probe 150 into an association mode (block 304). The receiver 100 is placed into the association mode via inputs from the input device 132, such as a predetermined key sequence or a selection via a graphical user interface (GUI). In one embodiment, the probe 150 is placed into the association mode by activating the probe using an on/off switch 188. Both the receiver 100 and probe 150 are placed into the association mode within a comparatively short time period, such as a ten second time window.

Upon entering the association mode, the probe 150 generates a random number (block 308). In the probe 150, the random number is generated by sampling the frequency of the sensor oscillator 184 using the oscillator 176. The combined frequency drift of both oscillators provides sufficient entropy to generate the random number. Probes with alternative configurations generate random numbers using random noise that is generated by one or more probe components or optionally include a hardware random number generator. In one alternative configuration, an operator presses a button in the probe 150 and the probe 150 generates a random number from the state of an internal timer in the controller 164 at the time that the operator pressed the button. Any configuration of hardware and software in the probe 150 that generates numbers in a random manner can be used in conjunction with process 300. Probe 150 generates a sixteen bit random number, but alternative embodiments employ random numbers with greater or fewer bits. The probe stores the generated random number in memory (block 312). During operation, the random number can identify the probe 150 to the receiver 100.

Process 300 continues with the probe transmitting the generated random number to the receiver (block 316). The probe can optionally transmit the random number with a transmission power level that is reduced from the standard electrical power level used to transmit data after the probe is associated with the receiver. The reduced transmission power level lowers the likelihood of a probe associating with another receiver. For example, in FIG. 2, the probe 150A should associate with the receiver 100A and not receivers 100B or 100C. The probe 150A is placed in close proximity to the receiver 100A and transmits the random number to the receiver 100A while the receiver 100A is in the association mode. Even if one or both of receivers 100B and 100C are in the association mode while probe 150A transmits, the other receivers are less likely to detect the transmitted signal. In another configuration, the probe 150A transmits the random number during the association process with the same transmission power level used to transmit data after the probe 150A associates with the receiver 100A. The probe 150A can transmit additional data during the association procedure such as calibration data from the sensor 180 to the receiver 100A.

The receiver 100 stores the random number that is transmitted from the probe 150 in the memory 154 (block 320). The receiver 100 stores the random number as one of the probe ID values 108 in the memory 154. Sensor data from the probe 150, the present state of the LFSR 106, and drift correction values 112 are stored in association with the probe ID 108 in the memory 154. After the association process is completed, both the receiver 100 and probe 150 exit the association mode (block 324). After completion of the association process, the receiver 100 ignores association messages generated by other probes, and the newly associated probe begins transmitting sensor data to the receiver as described in process 400. The association process 300 is performed multiple times to associate a plurality of probes with a single receiver.

Figure 4:
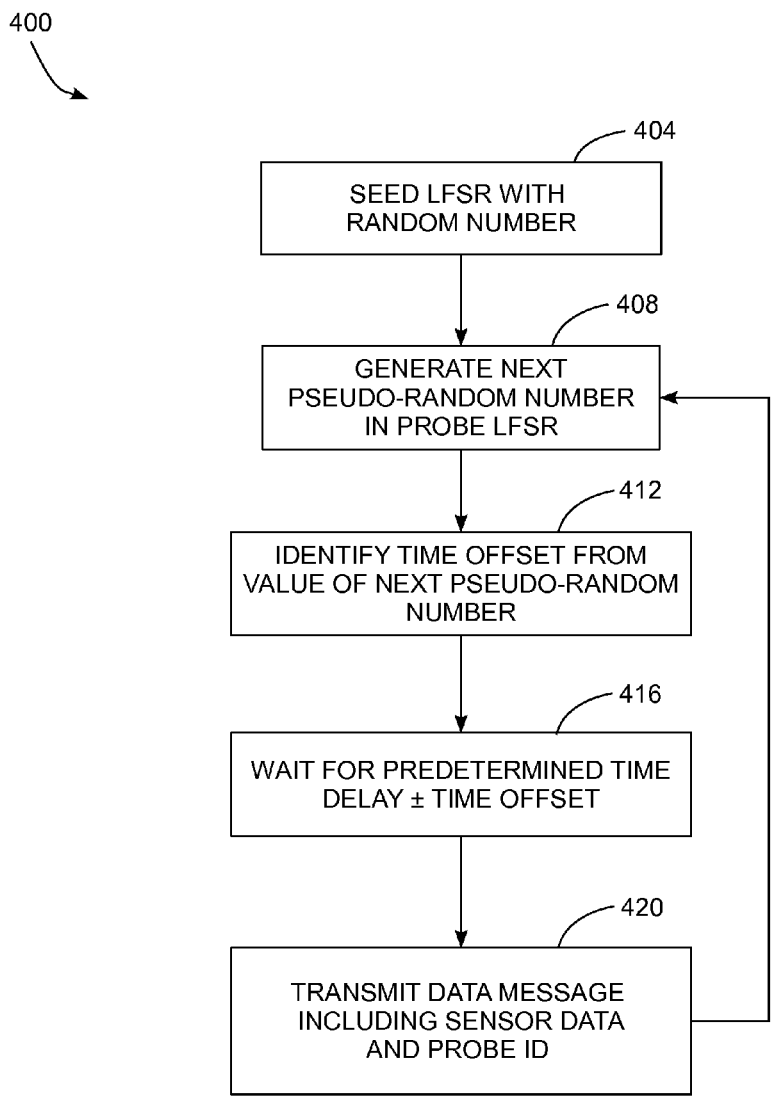
FIG. 4 is a block diagram of a method for operating a probe.

FIG. 4 depicts a process 400 for operating a probe to transmit sensor data to a receiver. The probe 150 from FIG. 1 is referenced by way of example. The process 400 introduces a time offset to the transmission of data from the probe 150. The time offset changes in a pseudo-random manner between each transmission from the probe 150. Process 400 begins after the probe 150 completes the association process 300 with the receiver. The probe provides the random number generated during process 300 as a seed value to a linear feedback shift register (LFSR) in the probe (block 404). In probe 150, the memory 154 stores the random number as a probe identifier (ID) 158. The LFSR 156 in the memory 154 is a sixteen bit range in the memory 154 that is seeded with the random number by writing the value of the probe ID number to the LFSR memory 156.

Process 400 continues by generating a pseudo-random number using the LFSR 156 (block 408). The LFSR generates a new pseudo-random number after each cycle, and the LFSR is configured to generate one new pseudo-random number corresponding to each transmission from the probe. In the probe 150, the controller 164 reads the current value of the LFSR 156 from the memory 154, performs the LFSR operations by executing programmed instructions in the stored program data 162, and overwrites the value in the LFSR 156 with the newly generated pseudo-random number. In one embodiment of the probe 150, the LFSR is implemented using a Galois configuration with the six-most significant bits in the register used as tap bits. The least significant bit in the LFSR is shifted out and referred to as an "output bit." The output bit is XORed with the tap bits, the entire register shifts by one bit from the most significant bit towards the least significant bit, and the output bit is placed in the most significant bit slot. Various other LFSR configurations using more or fewer tap bits as well as different pseudo-random number generators are also suited for use with the probe 150, provided that the probes and the receiver use a common pseudo-random number generator implementation.

Process 400 continues by identifying a time offset from the newly generated value of the LFSR (block 412). In the probe 150, the six most significant bits in the LFSR are converted into a signed integer having values from −32 to 31, inclusive. The time offset is formed by multiplying the random number by a predetermined time increment. The time increment is selected to be relatively large compared to the amount of time that the probe 150 spends transmitting a single data message to the receiver. For example, if a single transmission from the probe 150 has a duration of approximately ten milliseconds, the predetermined increment could be between ten and one hundred milliseconds. The time offset is a multiple of the predetermined time increment, with a positive offset value indicating that the probe 150 should delay transmission by the time offset, and with a negative offset value indicating that the probe should bring the transmission forward in time by the time offset.

Once the time offset is identified, process 400 waits for a predetermined time period±the length of the time offset (block 416). In the probe 150, the controller 164 includes one or more timer components, including timer hardware or software based timers that enable the probe 150 to wait for the identified time period. The oscillator 176 provides a periodic signal to the controller 164 that the controller 164 uses to measure time periods. The predetermined time period is an average inter-transmission time period for probe 150. In one embodiment, the predetermined time period is ten seconds. Each of the probes is configured to use the same predetermined time period, but the predetermined time periods between different probes are not synchronized. For example, the beginning and ending of the predetermined time period for the probe 150A in FIG. 2 occurs independently of the beginning and ending of the predetermined time period for the probe 150B. The actual time that each probe waits between each transmission changes based on the length of the time offset. The time offset is calculated at the beginning of each time period so that the probe 150 can transmit at an earlier time than the end of the predetermined time period. Once the waiting period concludes, the probe 150 transmits a data message to the receiver (block 420). The data message includes both data from the sensor 180, and also the probe ID 168 that the receiver uses to identify the probe. The data message also includes the current number stored in the LFSR 156 within the probe 150. The receiver 100 compares the state of the LFSR 106 in the memory 104 with the LFSR number transmitted from the probe 150, and can re-synchronize the internal LFSR 106 with the transmitted LFSR number if the receiver fails to receive multiple consecutive messages from the probe during process 400. Process 400 returns to block 408 and iterates while the probe 150 is in operation.

Figure 6:
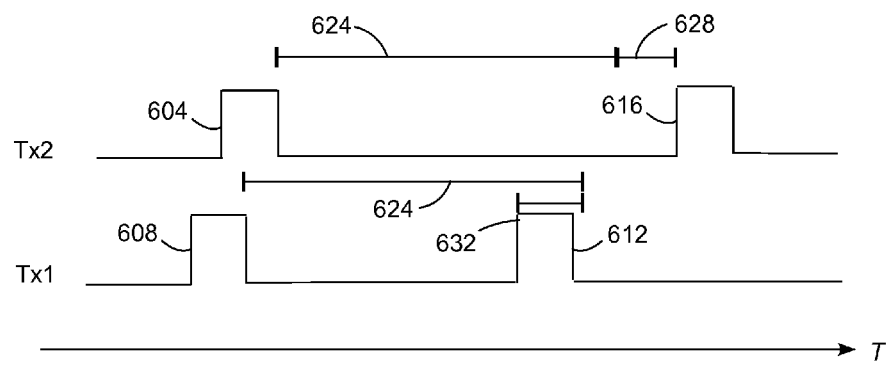
FIG. 6 is a timing diagram depicting signals generated by two probes.

Each probe transmits data using process 400 to minimize recurring collisions between transmissions sent by different probes. FIG. 6 depicts a diagram of transmissions from a first probe Tx1 and second probe Tx2 over time. Probe Tx1 transmits a first signal 608 that arrives at a receiver at the same time that another signal 604 transmitted from Tx2 arrives at the receiver. The signals 604 and 608 collide at the receiver because parts of each signal arrive at the receiver simultaneously. The next transmission from each of the probes is delayed by the single predetermined time period 624±the pseudo-random time offset. Since the states of the LFSRs in the probes Tx1 and Tx2 are most likely different, the time offsets applied to the transmissions for Tx1 and Tx2 also differ. In FIG. 6, the offset 628 delays the subsequent transmission 616 from Tx2 and the offset 632 brings the subsequent transmission 612 from Tx1 forward in time. The transmissions 612 and 616 do not collide, and the receiver can receive one or both transmissions.

FIG. 6 depicts a situation where two transmissions collide, but the pseudo-random time offsets prevent multiple collisions from occurring. The situation depicted in FIG. 6 occurs most frequently when a collision occurs. However, in less common instances the pseudo-random delays from two colliding transmitters match one another during multiple transmissions. The LFSR registers in both transmitters that produce the collision may have the same state, or the set of tap bits that determine the time offset may have equivalent values over the course of several consecutive transmissions.

Figure 7:
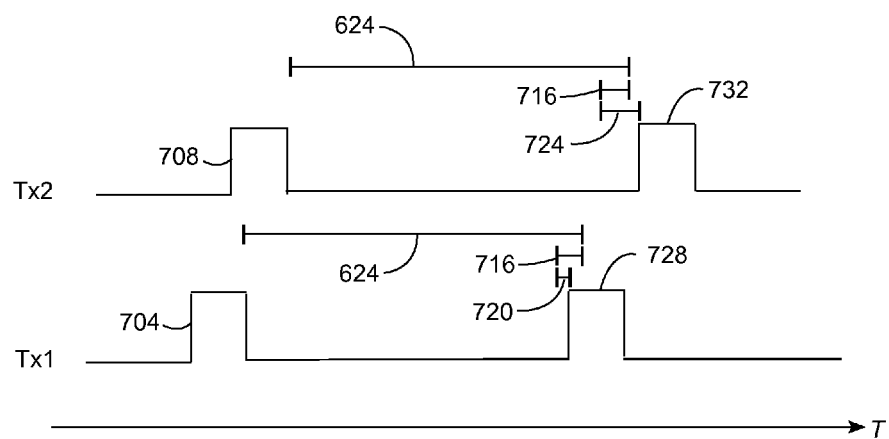
FIG. 7 is another timing diagram depicting signals generated by two probes.

As depicted in FIG. 7, the frequency drift of the oscillator in the probe and the associated time drift of the probe enable two probes to avoid multiple collisions even if the states of the pseudo-random number generators in each probe are equivalent. Probes Tx1 and Tx2 in two different probes generate colliding signals 704 and 708, respectively. Each probe is configured to wait for the predetermined time period 624 with an equivalent time offset 716. Thus, the probes are expected to transmit the subsequent signals 728 and 732 at the same time, resulting in another collision. The probes, however, each measure time with reference to a different oscillator that has a random frequency drift. The oscillator frequency drift results in a time drift, or variation between the identified time to wait between transmissions and the actual time to wait between transmissions. The probe Tx1 has time drift 720 and the probe Tx2 has a second time drift 724. The different time drifts 720 and 724 change the transmission times of the signals 728 and 732, and the signals do not collide. The relative magnitude and direction of frequency drift in different oscillators changes over time during operation of the probes, enabling probes that have similar time offset patterns to avoid collisions on recurring transmissions.

Figure 5:
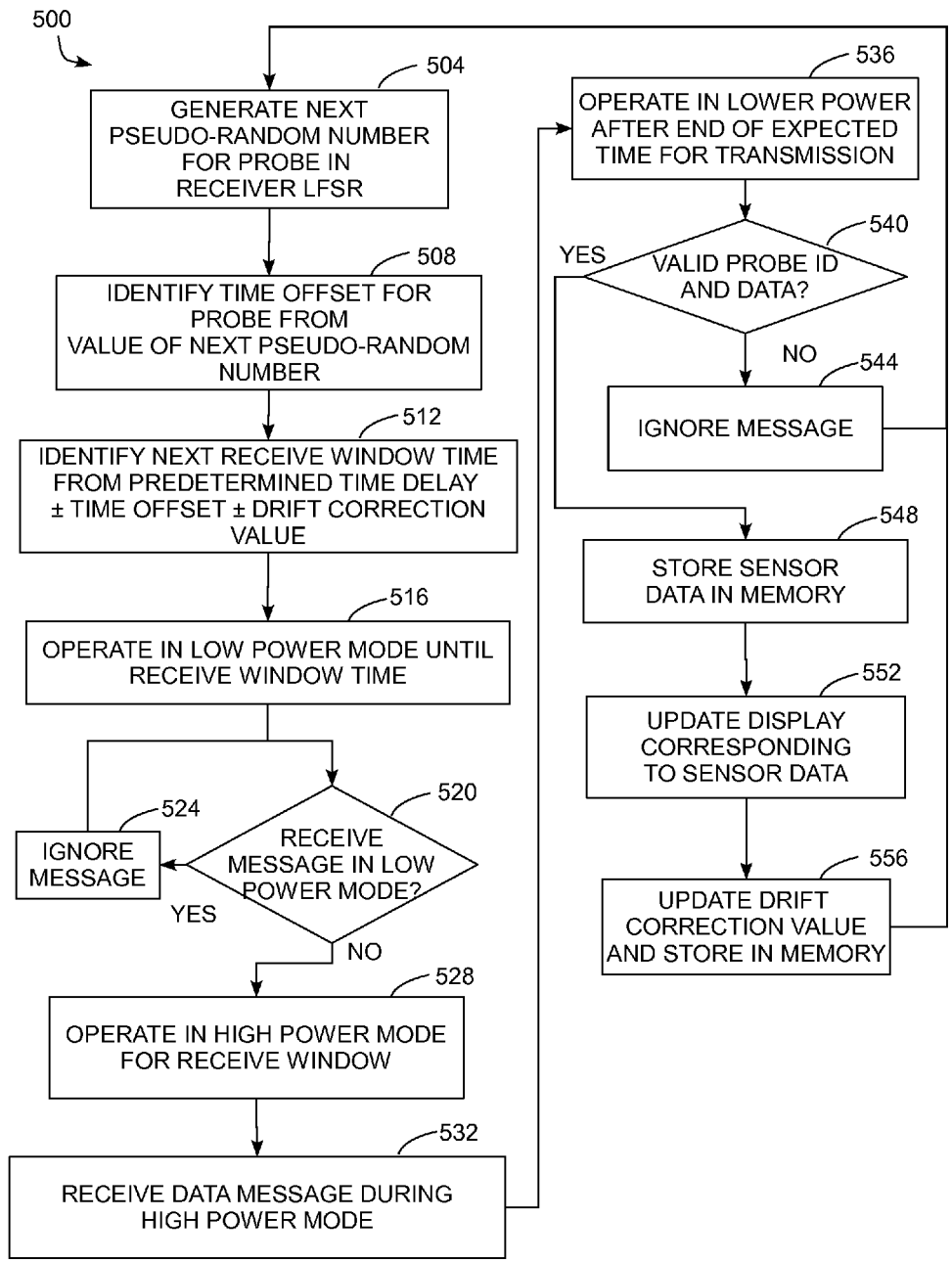
FIG. 5 is a block diagram of a method for operating a receiver.

FIG. 5 depicts a process 500 for operating a receiver to receive transmissions sent from one or more transmitters. Process 500 enables the receiver to operate in an energy efficient manner and to reject signals transmitted from probes that are not associated with the receiver. The receiver 100 from FIG. 1 is referenced by way of example. The receiver 100 performs process 500 after the probe completes the association process 300 with the receiver 100. Process 500 begins by generating the next pseudo-random number corresponding to a probe that is associated with the receiver (block 504). In receiver 100, each of the probe identifiers 108 in the memory 104 corresponds to an LFSR 106. The LFSR 106 is initially seeded with the probe identifier number, and the LFSR 106 generates a pseudo-random number for each time the corresponding probe 108 transmits a signal. In the receiver 100, the controller 120 performs the functions of the LFSR and stores the pseudo-random numbers in the LFSR memory 106. The receiver 100 performs the same LFSR process that is described above with reference to the probe 150. Thus, the receiver 100 generates the same pseudo-random number that the corresponding probe generates. The receiver 100 identifies a time offset for the next transmission of the probe using the pseudo-random number in the same manner as the probe (block 508).

Process 500 continues by identifying a receiving time window corresponding to a time that the probe is expected to transmit the next signal (block 512). The receiving time window refers to a period of time during which the receiver is configured to receive a transmission from the probe. The time window is longer than the expected transmission time of the transmitter to account for time drift of the probe and the receiver. For example, for transmissions that last ten milliseconds, the receiver 100 is configured to have a receiving time window of fifteen milliseconds. The receiving time window opens prior to the expected beginning of the next transmission, and lasts past the expected end of the next transmission. The controller 120 in the receiver 100 identifies the beginning of the next receiving time window using the predetermined time period that the probes wait between transmissions, the identified time offset from the pseudo-random number corresponding to the probe, and with reference to a drift correction value 112 that is stored in the memory 104. The drift correction value 112 is an observed time drift from one or more earlier transmissions of the probe. The drift correction value is either added to or subtracted from the expected start of the receiving time window.

In process 500, the receiver operates in a low power mode prior to the beginning of the receiving time window (block 516). Many receiver embodiments are supplied with electrical power from a battery, and the low-power operational mode reduces electrical power consumption resulting in prolonged battery life. In some embodiments, the RF receiver module 124 can be deactivated completely. In this mode, the receiver module 124 is incapable of receiving transmitted signals. In other embodiments, the receiver module 124 operates at lower power with a reduced sensitivity. The receiver module 124 may still receive transmissions that have sufficient signal strength. If any such signals are received while the receiver operates in a low power mode (block 520) the receiver ignores the signals (block 524). The receiver 100 is configured to remain in low-power mode during time periods when none of the probes associated with the receiver are expected to transmit. Consequently, transmissions from non-associated probes are ignored when the receiver operates in low power mode.

Figure 8:
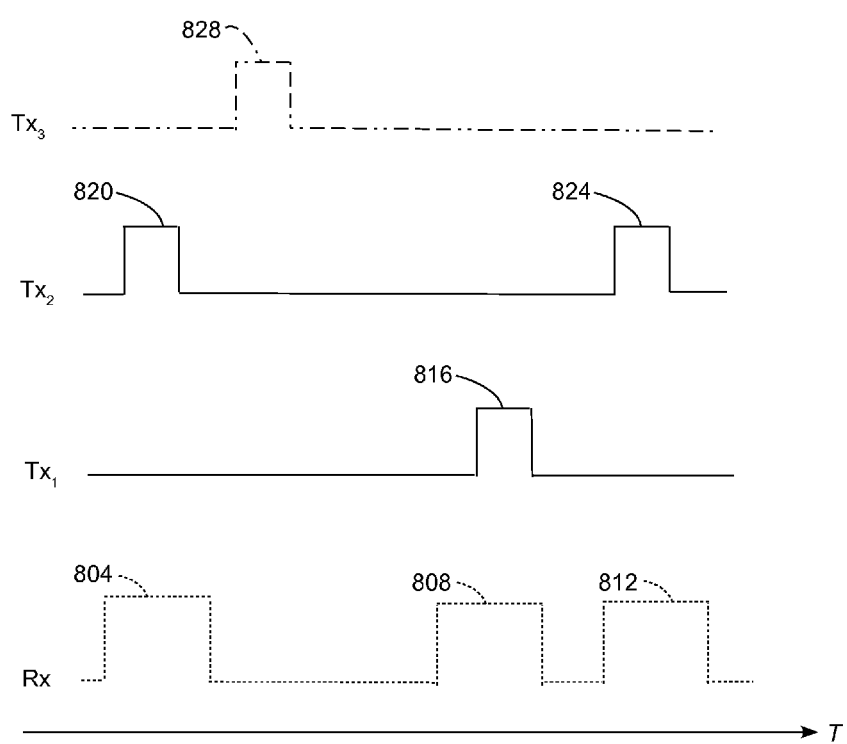
FIG. 8 is a timing diagram depicting operation of a receiver to receive signals generated by two probes.

The receiver 100 returns to a high power mode at the beginning of the receive time window (block 528). The receiver 100 receives the transmission from the probe during the receiving time window (block 532) and then returns to the low power mode (block 536). FIG. 8 depicts the receiving time windows for a receiver that is configured to receive signals from probes Tx1 and Tx2. The first receiving time window 804 opens prior to reception of signal 820 transmitted from the probe Tx2. The second receiving time window 808 opens to prior to reception of signal 824 from the prove Tx1. A third receiving time window 812 opens prior to reception of a second signal 824 from Tx2. The receiver is configured to perform process 500 for each associated probe to enable the receiver to operate at high power during receiving time windows for each transmission from each probe. The non-associated probe Tx3 also transmits a signal 828, but the receiver ignores the signal since the signal is sent outside of one of the receiving time windows.

Referring again to FIG. 5, the receiver 100 validates that the correct probe sent the received message using the probe identifier (block 540). Each transmitted message includes the random number that the probe generated during the association process 300, and the current number stored in the LFSR in the probe. The receiver 100 stores the probe identifiers 108 in the memory 104, and compares the identifier in the message to the stored probe identifier 108. In the event of a collision, the signal from another probe may reach the receiver, or the signals may interfere resulting in corrupted data. The probes and receiver can use various methods including checksums and cyclical redundancy checks to verify the integrity of the transmitted data. If either the probe identifier or data are invalid (block 540), the receiver ignores the data message (block 544) and process 500 returns to block 504. Process 500 continues even when an invalid message is received so that the receiver 100 is configured to receive the next transmission from the probe.

If the receiver 100 receives a valid data message from the correct probe, the receiver 100 stores the sensor data 110 corresponding to the probe identifier 108 in the memory 104 (block 548). In the receiver 100, the controller 120 processes the sensor data, and generates display data or other output based on the contents of the sensor data (block 552).

The receiver 100 updates the drift correction value 112 stored in the memory 104 after receiving a data message from a probe (block 556). The drift correction value is updated to align the midpoint of the signal received from the probe with the midpoint of the receiving time window. For example, if the transmitted signal has a duration of 10 milliseconds and the receiving time window has a duration of 15 milliseconds, then the midpoint of the signal at 5 milliseconds should coincide with the midpoint of the receiving timing window at 7.5 milliseconds. Due to timing drift of both the probe and the receiver, the actual midpoint of the transmitted signal deviates from the midpoint of the receiving time window. The drift correction value is the inverse of the detected deviation from the previous transmission. For example, if the midpoint of the signal occurs at 6 milliseconds into the receiving time window, then the drift correction value is incremented a value of −1.5 milliseconds, with the negative sign indicating that the receiving time window should open 1.5 milliseconds earlier in time to offset the time drift. The time drift of the probe and receiver vary during operation, so the drift correction value is updated for each transmission that the receiver receives from the probe. Process 500 continues at block 504 for the receiver 100 to receive the next message from the probe.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. A method for multiple access comprising:
generating a random number in a radio transmitter with reference to a signal from a first oscillator that is associated with the radio transmitter and another signal from a second oscillator that is associated with a moisture sensor;
transmitting the random number from the radio transmitter to a radio receiver;

initializing a first predetermined pseudo-random process with the random number in the radio transmitter;

identifying with the radio transmitter a plurality of transmission times for transmission of a plurality of data messages from the radio transmitter, each transmission time in the plurality of transmission times being identified with reference to a predetermined time period between transmitting each data message in the plurality of data messages that is modified with reference to one pseudo-random time offset from the first predetermined pseudo-random process, and a time of transmission of a previous data message in the plurality of data messages;

transmitting each data message in the plurality of data messages from the radio transmitter at a corresponding transmission time in the plurality of transmission times;

receiving the random number from the radio transmitter with the radio receiver;

initializing a second predetermined pseudo-random process with the random number in the radio receiver;

identifying with the radio receiver the plurality of transmission times from the radio transmitter, each transmission time in the plurality of transmission times being identified with reference to the predetermined time period between transmitting each data message in the plurality of data messages modified with reference to one pseudo-random time offset from the second predetermined pseudo-random process, and another time of transmission of a previous data message in the plurality of data messages;

operating the radio receiver at a first electrical power level for a first plurality of time periods that correspond to time periods between the plurality of transmission times for the radio transmitter; and operating the radio receiver at a second electrical power level for a second plurality of time periods corresponding to the plurality of transmission times for the radio transmitter to enable the radio receiver to receive the plurality of data messages transmitted by the radio transmitter, the second electrical power level being greater than the first electrical power level.

2. The method of claim 1, the generation of the random number further comprising:
    identifying a first frequency drift in the signal generated by the first oscillators;
    identifying a second frequency drift in the other signal generated by the second oscillator; and
    identifying the random number with reference to a combination of the first frequency drift and the second frequency drift.

3. The method of claim 1, the transmission of the random number and at least one data message in the plurality of data messages with the radio transmitter further comprising:
    transmitting the random number at a third electrical power level; and
    transmitting the at least one data message at a fourth electrical power level, the fourth electrical power level being greater than the third electrical power level.

4. The method of claim 1, wherein the plurality of data messages include moisture data generated by the moisture sensor that is communicatively coupled to the radio transmitter.

5. A sensor system including a first sensor probe and radio receiver, the first sensor probe comprising:
    a first radio transmitter module;
    a first oscillator;
    a first sensor configured to generate sensor signals, the first sensor further comprising:
        a first capacitive element that is configured to be inserted in soil;
        a second oscillator operatively coupled to the first capacitive element; and
    a first controller operatively connected to the first sensor, the first oscillator, and the first radio transmitter module the first controller being configured to:
        generate a first random number with reference to a signal generated by the first oscillator and another signal generated by the second oscillator in the first sensor;
        operate the first radio transmitter module to transmit the first random number to a radio receiver;
        initialize a first predetermined pseudo-random process with the first random number;
        identify a first plurality of transmission times for transmission of a plurality of data messages from the first radio transmitter module, each transmission time in the first plurality of transmission times being identified with reference to a predetermined time period between transmitting each data message in the first plurality of data messages modified with reference to one pseudo-random time offset from the first predetermined pseudo-random process, and a time of transmission of a previous data message in the first plurality of data messages; and
        transmit each data message in the first plurality of data messages from the first radio transmitter module at a corresponding transmission time in the first plurality of transmission times; and
    the radio receiver comprising:
        a radio receiver module; and
        a second controller operatively connected to the radio receiver module, the second controller being configured to:
            receive the first random number from the first sensor probe with the radio receiver module;
            initialize a second predetermined pseudo-random process with the first random number;
            identify the first plurality of transmission times from the first sensor probe each transmission time in the first plurality of transmission times being identified with reference to the predetermined time period between transmitting each data message in the first plurality of data messages modified with reference to one pseudo-random time offset from the second predetermined pseudo-random process, and another time of transmission of a previous data message in the first plurality of data messages;
            operate the radio receiver module at a first electrical power level for a first plurality of time periods that correspond to time periods between the first plurality of transmission times for the first sensor probe; and
            operate the radio receiver module at a second electrical power level for a second plurality of time periods corresponding to the first plurality of transmission times for the first sensor probe to enable the radio receiver module to receive the first plurality of data messages transmitted by the first sensor probe, the second electrical power level being greater than the first electrical power level.

6. The sensor system of claim 5, the first radio transmitter module in the first sensor probe being further configured to:
    transmit the first random number at a third electrical power level; and transmit at least one data message in the first plurality of data messages at a fourth electrical power level, the fourth electrical power level being greater than the third electrical power level.

7. The sensor system of claim 5, the first controller in the first sensor probe being further configured to:
identify a first frequency drift associated with the first oscillator;
identify a second frequency drift associated with the second oscillator; and
identify the first random number with reference to a combination of the first frequency drift and the second frequency drift.

8. The sensor system of claim 5 further comprising:
a second sensor probe comprising:
a second radio transmitter module;
a third oscillator;
a second sensor configured to generate sensor signals, the second sensor further comprising:
a second capacitive element that is configured to be inserted in soil;
a fourth oscillator operatively coupled to the second capacitive element; and
a third controller operatively connected to the second sensor, the third oscillator, and the second radio transmitter module the third controller being configured to:
generate a second random number with reference to a signal generated by the third oscillator and another signal generated by the fourth oscillator in the second sensor;
operate the second radio transmitter module to transmit the second random number to the radio receiver;
initialize a third predetermined pseudo-random process with the second random number;
identify a second plurality of transmission times for transmission of a second plurality of data messages from the second radio transmitter module, each transmission time in the second plurality of transmission times being identified with reference to the predetermined time period between transmitting each data message in the second plurality of data messages that is modified with reference to one pseudo-random time offset from the third predetermined pseudo-random process, and a time of transmission of a previous data message in the second plurality of data messages; and
transmit each data message in the second plurality of data messages from the second radio transmitter module at a corresponding transmission time in the second plurality of transmission times; and
the second controller in the radio receiver being further configured to:
receive the second random number from the other sensor probe with the radio receiver module;
initialize a fourth predetermined pseudo-random process with the second random number;
identify the second plurality of transmission times from the second sensor probe each transmission time in the second plurality of transmission times being identified with reference to the predetermined time period between transmitting each data message in the second plurality of data messages that is modified with reference to one pseudo-random time offset from the fourth predetermined pseudo-random process, and another time of transmission of a previous data message in the second plurality of data messages;
operate the radio receiver module at the first electrical power level for a third plurality of time periods that correspond to time periods between the first plurality of transmission times for the first sensor probe and the second plurality of transmission times for the second sensor probe; and
operate the radio receiver module at the second electrical power level for a fourth plurality of time periods corresponding to the first plurality of transmission times for the first sensor probe and the second plurality of transmission times for the second sensor probe to enable the radio receiver module to receive the first plurality of data messages transmitted by the first sensor probe and the second plurality of data messages transmitted by the second sensor probe.

* * * * *